United States Patent
Tokuda

(10) Patent No.: US 9,937,699 B2
(45) Date of Patent: Apr. 10, 2018

(54) LABEL PEELING DEVICE, FLUID EJECTION DEVICE, AND LABEL PEELING METHOD

(71) Applicant: Seiko Epson Corporation, Tokyo (JP)

(72) Inventor: Takeshi Tokuda, Shioriji (JP)

(73) Assignee: SEIKO EPSON CORPORATION, Tokyo (JP)

( * ) Notice: Subject to any disclaimer, the term of this patent is extended or adjusted under 35 U.S.C. 154(b) by 49 days.

(21) Appl. No.: 14/744,632

(22) Filed: Jun. 19, 2015

(65) Prior Publication Data
US 2015/0367623 A1     Dec. 24, 2015

(30) Foreign Application Priority Data

Jun. 19, 2014  (JP) ................................ 2014-125893
Jun. 20, 2014  (JP) ................................ 2014-127007

(51) Int. Cl.
*B32B 43/00*     (2006.01)
*B65C 9/00*      (2006.01)

(52) U.S. Cl.
CPC .......... *B32B 43/006* (2013.01); *B65C 9/0006* (2013.01); *B32B 2519/00* (2013.01); *B65C 2009/0009* (2013.01); *Y10T 156/1105* (2015.01); *Y10T 156/1195* (2015.01); *Y10T 156/179* (2015.01); *Y10T 156/1906* (2015.01); *Y10T 156/1978* (2015.01); *Y10T 156/1994* (2015.01)

(58) Field of Classification Search
CPC .......... B65C 9/0006; B65C 2009/0009; B32B 38/10; B32B 43/006; Y10T 156/1195; Y10T 156/1978; Y10T 156/1994
See application file for complete search history.

(56) References Cited

U.S. PATENT DOCUMENTS

| | | | | |
|---|---|---|---|---|
| 5,300,160 A | * | 4/1994 | Wilson | B65C 9/1884 156/541 |
| 5,849,143 A | * | 12/1998 | Ingalls | B65C 9/1869 156/361 |
| 5,938,890 A | * | 8/1999 | Schlinkmann | B65C 9/1884 156/230 |

(Continued)

FOREIGN PATENT DOCUMENTS

| | | |
|---|---|---|
| CN | 101992871 A | 3/2011 |
| JP | 10-310119 A | 11/1998 |

(Continued)

*Primary Examiner* — Mark A Osele
(74) *Attorney, Agent, or Firm* — Nutter McClennen & Fish LLP; John J. Penny, Jr.

(57) ABSTRACT

A label peeling device has a holding unit that can hold label paper conveyed from a label printer that ejects ink onto label paper P having labels Pb and a liner Pa to which the labels Pb are affixed; a peeling unit that is disposed downstream on the label paper P conveyance path from the holding unit, can move bidirectionally between a start peeling position separated from the holding unit and an end peeling position near the holding unit, and peels labels Pb from the liner Pa by moving from the start peeling position to the end peeling position; a motor that moves the peeling unit; an encoder that detects the position of the peeling unit; and a controller that controls the motor based on the position of the peeling unit detected by the encoder.

19 Claims, 15 Drawing Sheets

(56) References Cited

U.S. PATENT DOCUMENTS

| | | | | |
|---|---|---|---|---|
| 6,328,086 B1 * | 12/2001 | Takahashi | ............ | B65C 11/004 |
| | | | | 156/362 |
| 6,923,878 B2 * | 8/2005 | Davis | ................... | B65C 9/1865 |
| | | | | 156/351 |
| 7,294,216 B2 * | 11/2007 | Whelan | ................. | B65C 9/1884 |
| | | | | 156/247 |
| 9,611,062 B2 * | 4/2017 | Palmisano | ............ | B65C 9/1869 |
| 2003/0070750 A1 * | 4/2003 | Moore | ................... | B65H 20/04 |
| | | | | 156/249 |

FOREIGN PATENT DOCUMENTS

| | | | |
|---|---|---|---|
| JP | 2007-015313 A | 1/2007 | |
| JP | 2009-012851 A | 1/2009 | |
| JP | 2009-096490 A | 5/2009 | |
| WO | WO 2013180617 A1 * | 12/2013 | ........... B65C 9/1869 |

* cited by examiner

LABEL PEELING DEVICE, FLUID EJECTION DEVICE, AND LABEL PEELING METHOD

BACKGROUND

1. Technical Field

The present disclosure relates to a label peeling device that separates the labels from the liner backing of label paper, to a fluid ejection device, and to a method of peeling labels.

2. Related Art

Label printers that print using a thermal printing method and have a peeler for peeling labels from the liner of paper for producing labels (label paper) are known from the literature. Such peelers have a liner bending guide that folds only the liner portion of the label paper pulled from the print position of the thermal head, and a peeler roller that is disposed to the line discharge path downstream from the liner bending guide and together with the platen roller feeds the liner to the liner exit. The peeler peels labels from the liner by conveying the label paper with the label paper taut so that only the liner is folded back by the liner bending guide. When peeling a label from the liner in this label printer, the label paper is held between the thermal head and the platen roller.

As a result, pulling the label paper out more than the conveyance distance of the platen roller can be suppressed even when the label paper is conveyed with tension applied thereto for peeling. See, for example, JP-A-2007-015313.

Label peeling devices that have a take-up roller for rewinding label paper conveyed from a label printer, a peeling plate disposed between the label printer and the take-up roller to peel labels from the liner backing by bending the liner, an air cylinder that moves the peeling plate forward and back in the conveyance direction of the label paper, and a suction pad that holds the printing surface of the label, are known from the literature. When the printing surface of a label is held by the suction pad, this label peeling device separates the label from the liner by rewinding the liner onto the take-up roller while the air cylinder moves the peeling plate toward the label printer. See, for example, JP-A-2009-012851.

In an inkjet recording device, the label paper is not held by the ink ejection unit. As a result, when a peeler according to the related art is used with an inkjet recording device, the peeler may pull more of the label paper from the inkjet recording device than the amount the label paper that is fed by the conveyance unit of the inkjet recording device when the label paper is conveyed in a taut state to peel a label from the liner. This can cause printing problems such as ejected ink droplets not landing at the correct position in the image being recorded on the label paper.

Furthermore, when labels are peeled from the liner by moving a peeling member as in the label peeling device according to the related art, the amount of the label that is peeled will be constant if the distance the peeling member moves is constant. This means that the amount of the label that is peeled will remain the same regardless of the length of the label.

SUMMARY

A label peeling device, a fluid ejection device, and a label peeling method according to the disclosure suppress printing problems when printing labels by suppressing pulling the label paper from the fluid ejection device when peeling labels while printing labels with a fluid ejection device.

A label peeling device, fluid ejection device, and label peeling method according to the invention can also control the peeled length of the label.

A label peeling device according to one aspect of the invention has a holding unit able to hold label paper conveyed from a fluid ejection device that ejects fluid onto label paper having labels and a liner to which the labels are affixed; and a peeling unit that peels labels from the liner of the label paper fed from the fluid ejection device and is disposed downstream on the label paper conveyance path from the holding unit; the holding unit holding the label paper when the holding unit peels labels from the liner.

Thus comprised, a label can be peeled from the liner with the label paper held between the fluid ejection device and the peeling unit by the holding unit. The label paper being pulled from the fluid ejection device can therefore be suppressed.

Preferably, the peeling unit also has a peeling member that moves bidirectionally between a start peeling position separated from the holding unit and an end peeling position proximal to the holding unit, and separates a label from the liner by moving from the start peeling position to the end peeling position; and a conveyance unit that is disposed to the conveyance path of the label paper on the downstream side of the peeling member and conveys the label paper. The conveyance unit moves bidirectionally between the start peeling position and the end peeling position together with the peeling member.

Thus comprised, labels can be peeled from the liner of label paper from the downstream end to the upstream end of the label paper by moving the peeling member from the start peeling position to the end peeling position.

In addition, change in the angle to which the liner is folded by the holding unit, peeling member, and conveyance unit can be suppressed when the peeling member moves to and away from the holding unit. As a result, labels can be consistently peeled from the liner.

Preferably, the conveyance unit conveys the label paper with the holding unit in a release position when the label paper is conveyed from the fluid ejection device.

Thus comprised, excessive slack developing in the label paper when the label paper is conveyed from the fluid ejection device can be suppressed.

Further preferably, a label peeling device according to another aspect of the invention also has a slack detection unit that detects if there is slack in the label paper; and a control unit that controls conveyance of the label paper. When the conveyance unit conveys the label paper when label paper is fed from the fluid ejection device, the control unit controls the conveyance unit so that the conveyance unit stops conveying the label paper when the slack detection unit detects there is no slack in the label paper, and the conveyance unit resumes conveying the label paper when the slack detection unit detects there is slack in the label paper.

Thus comprised, a specific amount or more of slack can be constantly maintained when the conveyance unit conveys the label paper when a label is fed from the fluid ejection device. The actual conveyance of the label paper becoming greater than the conveyance distance by the fluid ejection device can be suppressed.

Further preferably, the label peeling device also has a hold switching unit that switches the holding unit to the holding position after the conveyance unit feeds the label paper with the holding unit in the release position; and a return unit that moves the peeling member from the end peeling position to the start peeling position after the peeling member moves from the start peeling position to the end peeling position.

Thus comprised, label paper fed from the fluid ejection device can be automatically held by the holding unit.

The peeling member can also be returned from the end peeling position to the start peeling position by the return unit.

Further preferably, the conveyance unit can change the conveyance direction of the label paper, and before or simultaneously to the peeling member moving from the end peeling position to the start peeling position after the peeling member moves from the start peeling position to the end peeling position, the conveyance unit feeds the label paper in reverse.

Thus comprised, the peeling unit can move smoothly without the label paper interfering with the peeling member when the peeling member moves from the end peeling position to the start peeling position even if the label paper is held by the holding unit.

Further preferably, the control unit controls the conveyance unit so that, when the conveyance unit feeds the label paper in reverse, the conveyance unit stops reverse conveyance of the label paper when the slack detection unit detects there is slack in the label paper, and resumes reverse conveyance of the label paper when the slack detection unit detects there is no slack in the label paper after conveyance stops.

Thus comprised, a consistent amount of slack can also be maintained when the conveyance unit back feeds the label paper. As a result, the actual distance the label paper is reversed becoming less than the back feed distance by the fluid ejection device can be suppressed.

Further preferably, the label peeling device also has a release switching unit that switches the holding unit to the release position after the peeling member is moved from the end peeling position to the start peeling position by the return unit with the holding unit in the holding position.

Thus comprised, holding the label paper by the holding unit can be automatically released after a label is peeled from the liner.

Further preferably in another aspect of the invention, the label peeling device also has a first drive source that moves the peeling unit from the start peeling position to the end peeling position; and a position detection unit that detects the position of the peeling unit; and the control unit controls the first drive source based on the position of the peeling unit detected by the position detection unit.

Thus comprised, by controlling the first drive source based on the detected position of the peeling unit, the distance the peeling unit is moved by the first drive source from the start peeling position to the end peeling position can be controlled. As a result, the amount of the label that is peeled can be optimally controlled.

A label peeling device according to another aspect of the invention preferably also has a movement distance setting unit that sets a peeling unit movement distance equal to the distance between the start peeling position and end peeling position; and the control unit controls the first drive source to move the peeling unit the peeling unit movement distance.

Thus comprised, the peeling unit can be moved from the start peeling position to the end peeling position according to the peeling unit movement distance that is set.

Further preferably, the label peeling device also has a second drive source that moves the peeling unit from the end peeling position to the start peeling position after the peeling unit moves from the start peeling position to the end peeling position; and the control unit controls the second drive source based on the position of the peeling unit detected by the position detection unit.

Thus comprised, by controlling the second drive source based on the detected position of the peeling unit, the distance the peeling unit is moved from the end peeling position to the start peeling position by the second drive source can be controlled.

Further preferably, the label peeling device also has a movement distance setting unit that sets a peeling unit movement distance equal to the distance between the start peeling position and end peeling position; and the control unit controls the second drive source to move the peeling unit the peeling unit movement distance.

Thus comprised, the peeling unit can be moved from the end peeling position to the start peeling position according to the peeling unit movement distance that is set.

Further preferably, the label peeling device also has a label detection unit that detects if the label peeled from the liner was removed from the liner; and after the peeling unit moves from the start peeling position to the end peeling position, the control unit blocks driving the second drive source if the label detection unit detects the label has not been removed from the liner.

If the peeling unit moves from the end peeling position to the start peeling position before the label is picked from the liner, the label that was peeled from the liner may stick to the liner again.

This aspect of the invention, however, prevents driving the second drive source before the label is taken from the liner. As a result, a label that was peeled from the liner sticking to the liner again can be prevented.

Further preferably, the position detection unit of the label peeling device also has a linear scale having markings extending between the start peeling position and the end peeling position; and a linear detector that reads the markings.

Another aspect of the invention is a fluid ejection device including: a fluid ejection unit that ejects fluid onto label paper, the label paper including labels and a liner to which the labels are affixed; a peeling unit that peels labels from the liner of the label paper fed from the fluid ejection unit; and a holding unit disposed and capable of holding the label paper upstream on the label paper conveyance path from the peeling unit, and specifically holding the label paper when the peeling unit peels the label from the liner.

Another aspect of the invention is a label peeling method of a label peeling device, including: holding by a holding unit label paper conveyed from a fluid ejection device that ejects fluid onto label paper having labels and a liner to which the labels are affixed; and peeling a label from the liner by a peeling member disposed downstream on the label paper conveyance path from the holding unit moving from a start peeling position separated from the holding unit to an end peeling position proximal to the holding unit.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 12A-12D illustrate the operation that peels a label from the liner in a label peeling device after recording an image on the label in a label printer.

DESCRIPTION OF EMBODIMENTS

A preferred embodiment of a label peeling device according to the present invention is described below with reference to the accompanying figures.

Note that the invention is described using the directions top, bottom, left, right, front, and rear as shown in the figures, but these directions are for descriptive convenience only, and the invention is obviously not limited to these directions.

Figure 1:
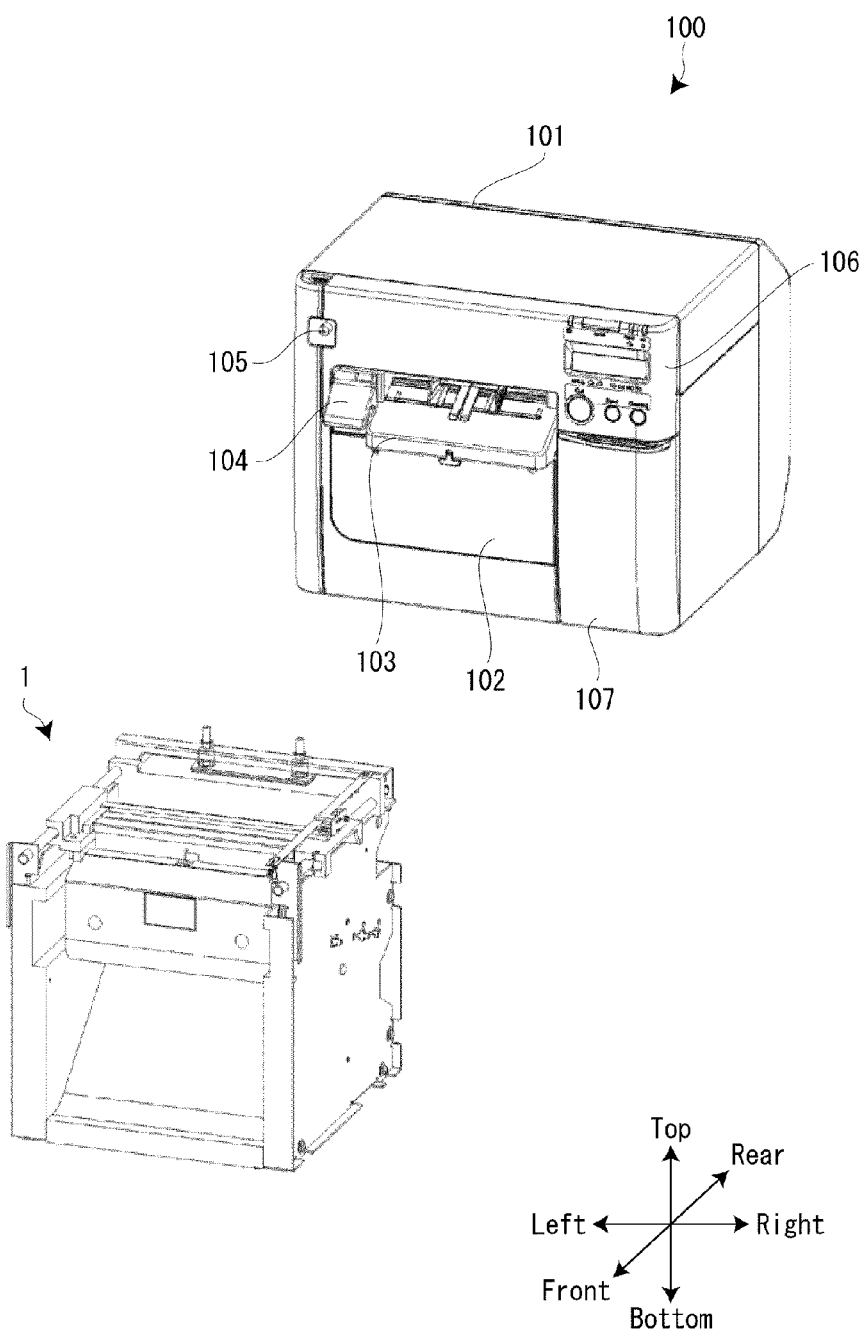
FIG. 1 is an oblique view of a label peeling device according to a preferred embodiment of the invention when not installed to the label printer.
Figure 2:
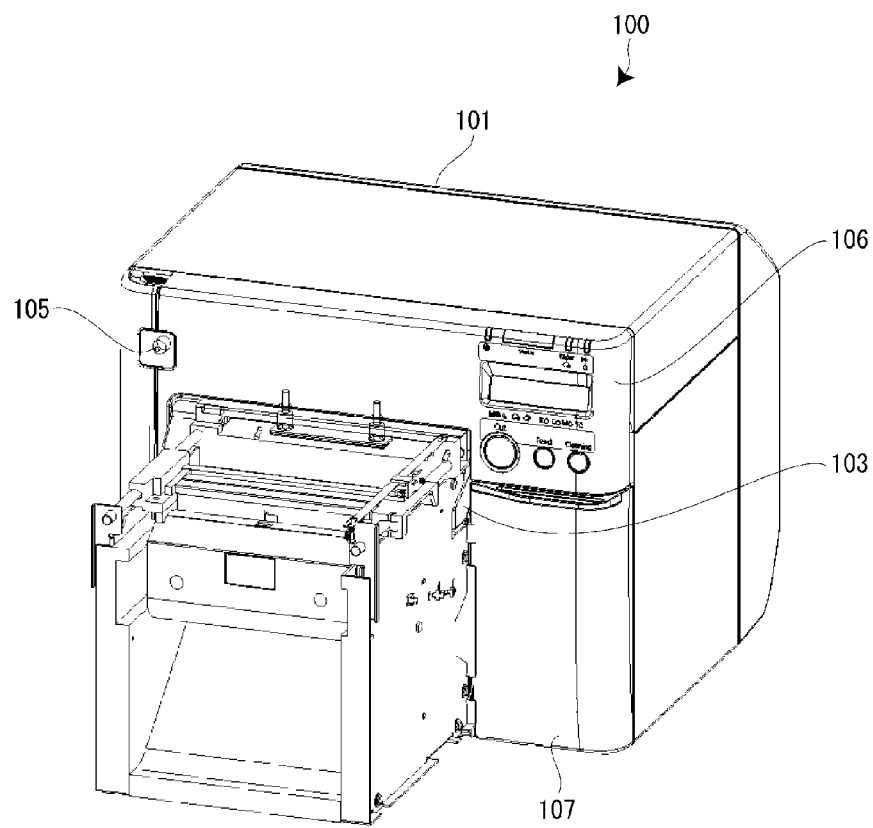
FIG. 2 is an oblique view of the label peeling device when installed to the label printer.
Figure 2:
Figure 3:
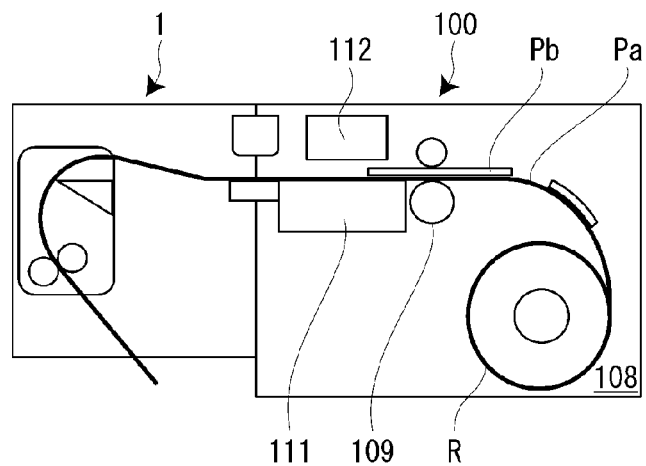
FIG. 3 illustrates the configuration of the label peeling device and label printer.
Figure 3:
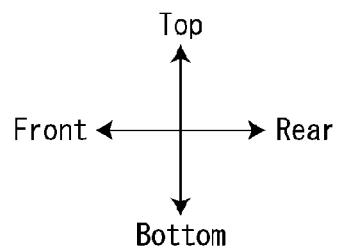

As shown in FIG. 1 to FIG. 3, a label peeling device 1 according to the invention is used installed to the front of the label printer 100, or more particularly to the paper exit side of the label printer 100. The label printer 100 is therefore described first below.

Note that the label printer 100 is an example of a fluid ejection device.

Based on image data received from a communicatively connected computer (not shown in the figure), the label printer 100 records images on the label paper P using an inkjet printhead. Note that the label printer 100 can also be used without the label peeling device 1 installed. The label peeling device 1 is therefore installed to the label printer 100 as an optional device.

The label paper P has a continuous web liner Pa, and multiple labels Pb affixed to the liner Pa with a substantially equal gap between adjacent labels Pb. The liner Pa and labels Pb are not limited to any particular type of material. The label paper P in this embodiment is provided as roll paper R, but is not so limited and may be fanfold paper, for example.

The label printer 100 has a basically rectangular box-like case 101. A roll paper cover 102, discharge table 103, release lever 104, power switch 105, operating panel 106, and ink cartridge cover 107 are disposed to the front of the case 101 where the paper exit is located. A roll paper supply unit 108, paper feed roller 109, platen 111, and recording head 112 are disposed inside the case 101.

The recording head 112 in this example is an example of a fluid ejection unit.

The roll paper cover 102 is normally locked in a position covering the front of the roll paper supply unit 108. To replace the roll paper R, for example, the user works the release lever 104 to unlock the roll paper cover 102. As a result, the user can rotate the roll paper cover 102 together with the discharge table 103 and release lever 104 forward pivoting at the bottom of the roll paper cover 102, and thereby open the roll paper supply unit 108.

If the label peeling device 1 is not installed, the discharge table 103 functions as a support for receiving the discharged label paper P. If the label peeling device 1 is installed, the discharged label paper P is not received by the discharge table 103, and is instead passed to the label peeling device 1. The discharge table 103 is basically trapezoidal when seen from the side, and engages a table receiving part 17 (described further below) of the label peeling device 1.

The roll paper R is loaded into the roll paper supply unit 108. The paper feed roller 109 is a nip roller. The paper feed roller 109 feeds the label paper P forward, that is, pulls the label paper P from the roll paper supply unit 108 and conveys it toward the recording head 112. The paper feed roller 109 can also back feed the label paper P, that is, convey the label paper P back into the roll paper supply unit 108. The recording head 112 has a plurality of inkjet heads for multiple colors of ink, such as the four CMYK colors. The recording head 112 ejects ink and records color images on the labels Pb of the label paper P conveyed over the platen 111. After passing the recording head 112, the label paper P is conveyed to the label peeling device 1 installed to the front of the label printer 100.

The label peeling device 1 is described next. The label peeling device 1 peels the labels Pb from the liner Pa of the label paper P conveyed from the label printer 100.

Figure 4:
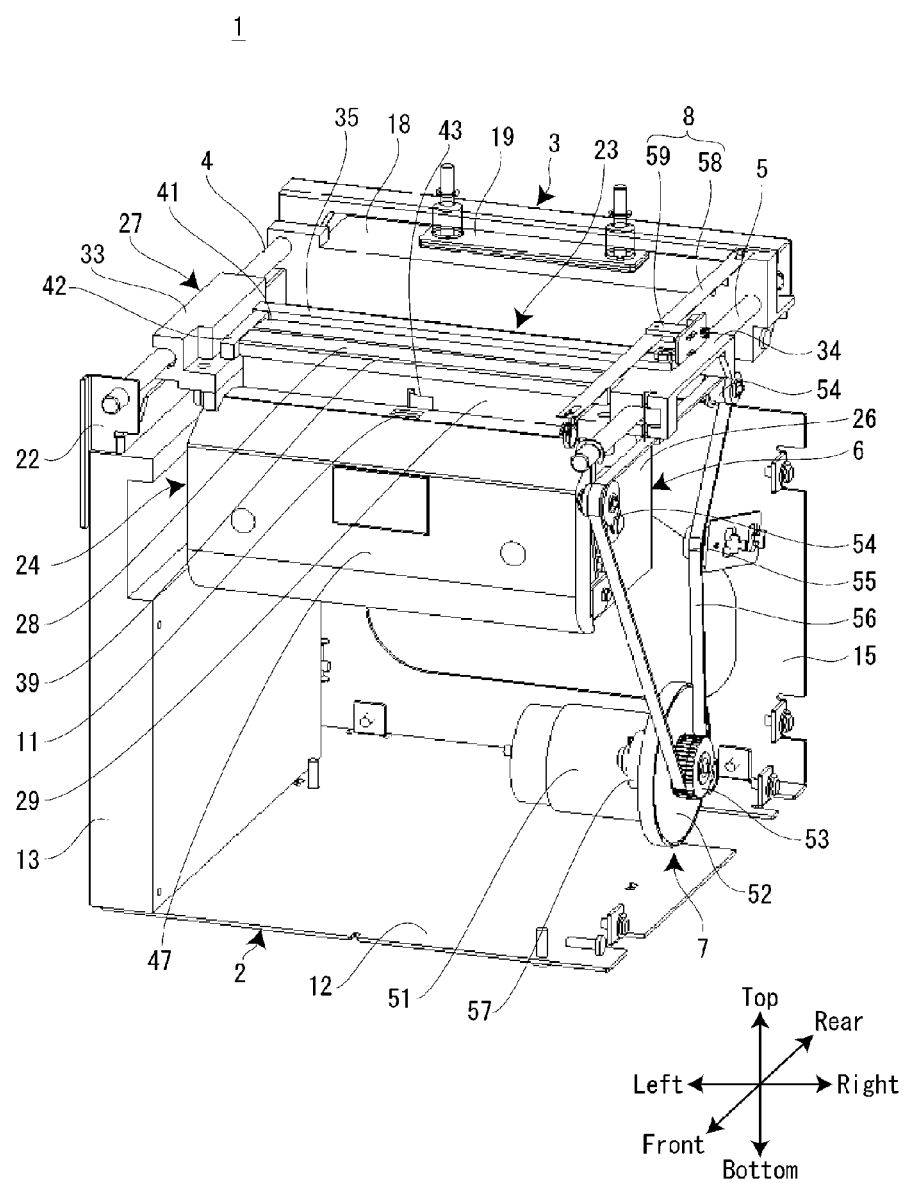
FIG. 4 is an oblique view of the label peeling device.
Figure 5:
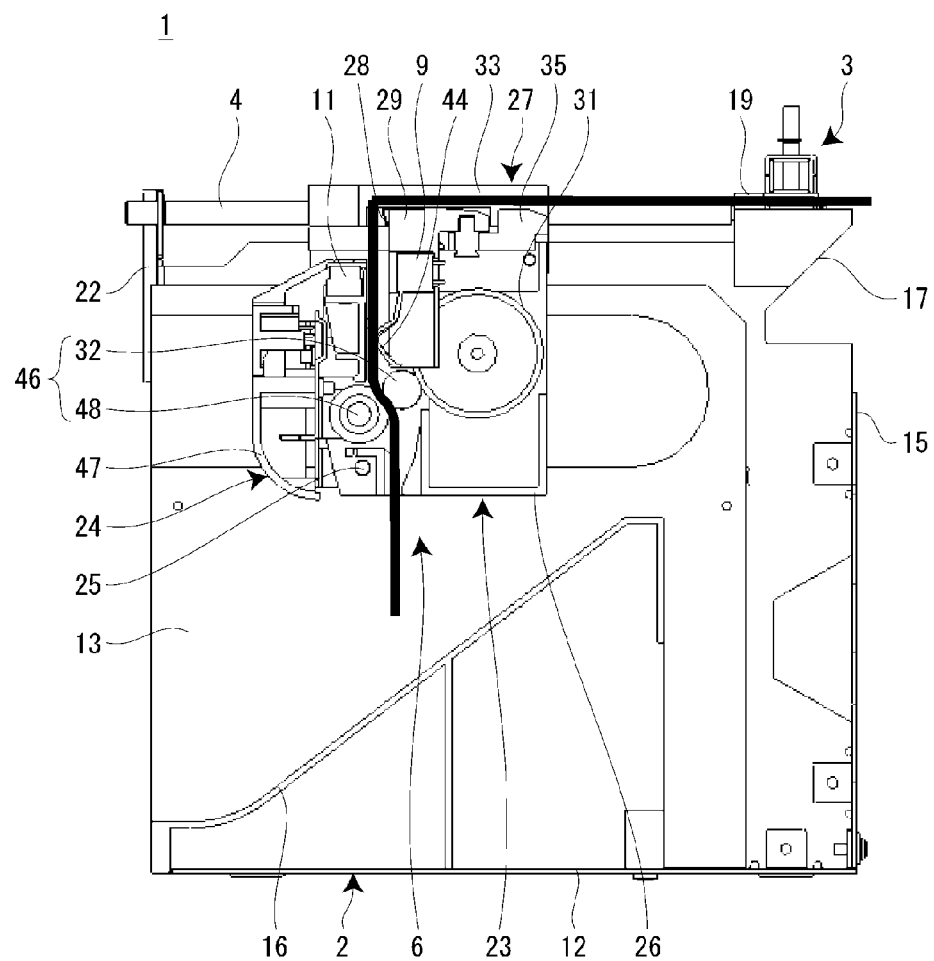
FIG. 5 is a section view of the label peeling device.
Figure 5:
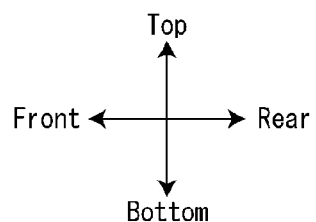
Figure 6:
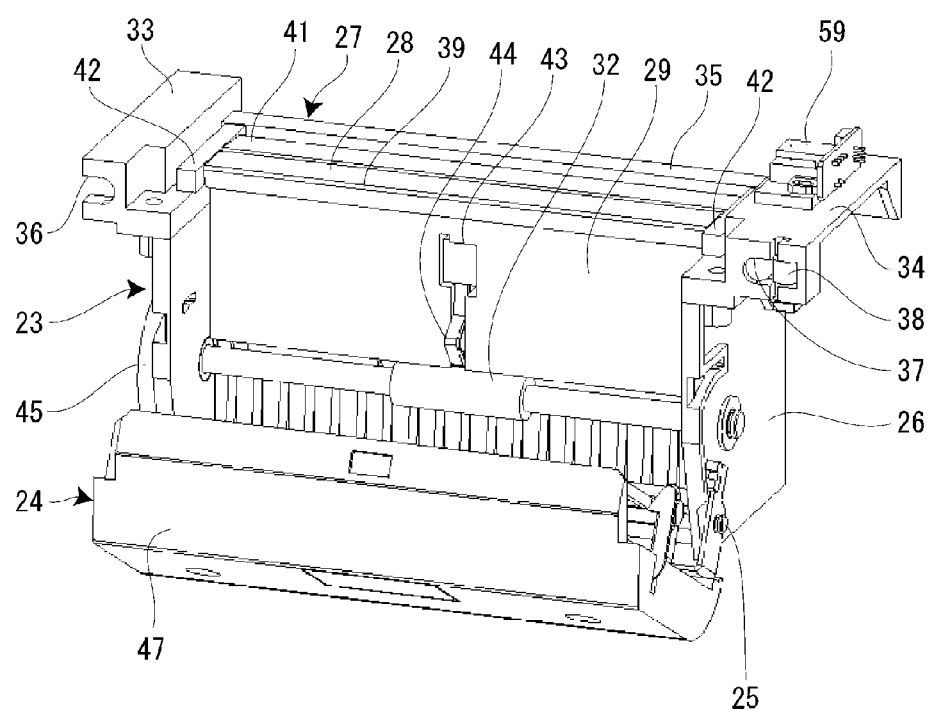
FIG. 6 is an oblique view of the peeling unit.
Figure 6:
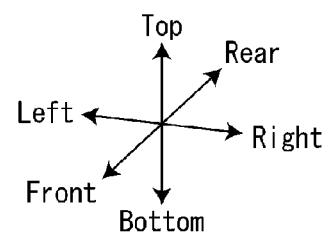
Figure 7:
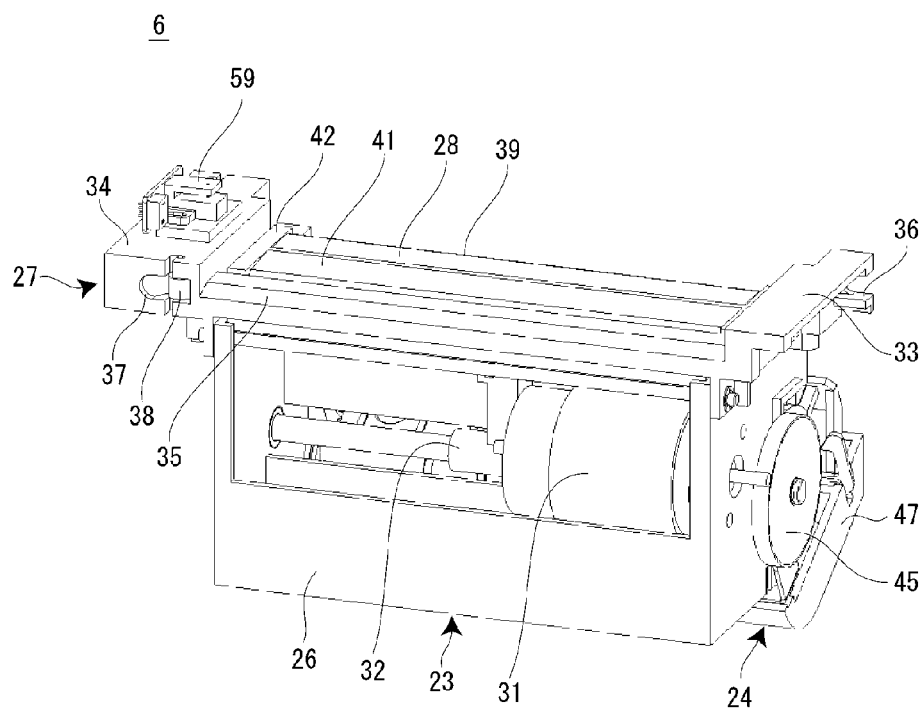
FIG. 7 is an oblique view of the peeling unit from a different angle than in FIG. 6.
Figure 7:
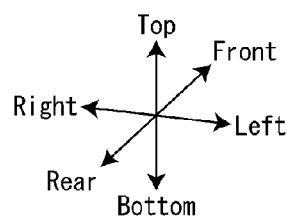

As shown in FIG. 4 and FIG. 5, the label peeling device 1 has a support base 2, holding unit 3, left guide rail 4, right guide rail 5, peeling unit 6, peeling unit moving unit 7, linear encoder 8, slack detector 9, and label detector 11.

Note that the peeling unit 6 is an example of the peeling unit in the accompanying claims; the peeling unit moving unit 7 is an example of a return unit; and the linear encoder 8 is an example of a position detection unit.

The support base 2 supports other parts of the label peeling device 1. The support base 2 includes a base plate 12, left panel 13, a right panel, a back panel 15, and an inclined panel 16.

The base plate 12 is substantially rectangular. The left panel 13 and the right panel are affixed to the left and right edge areas of the base plate 12. The left panel 13 and the right panel are also substantially rectangular.

The table receiving part 17 is formed as a substantially trapezoidal notch in the top of the back end of the left panel 13 and right panel. When the label peeling device 1 is installed to the label printer 100, the table receiving part 17 accepts the left and right sides of the discharge table 103. A drive pulley 53 and driven pulleys 54 are rotatably supported by the right panel.

The inclined panel 16 is disposed between the left panel 13 and right panel at an angle descending toward the front of the label peeling device 1. After the labels Pb are removed by the peeling unit 6, the liner Pa is received by the inclined panel 16 and is fed at an angle descending toward the front along the top of the inclined panel 16.

The holding unit 3 has a holding position where it holds the label paper P conveyed from the label printer 100, and a release position where it does not hold the label paper P. The holding unit 3 includes a support pedestal 18, a gripping member 19, and a gripping motor 21 (see FIG. 10).

The support pedestal 18 is attached to the top back part of the left panel 13 and right panel spanning the gap between the left panel 13 and right panel. The gripping member 19 is disposed substantially in the middle between the left and right ends of the support pedestal 18, and is substantially rectangular and long left to right. The gripping member 19 can move to and away from the support pedestal 18 between a holding position (FIG. 12 D) where the label paper P is held with the support pedestal 18, and a release position (FIG. 12 A to C) where the label paper P is not held.

The gripping motor 21 is the drive source for moving the gripping member 19 between the holding position and the release position. Note that an air cylinder, solenoid, or other drive means other than a motor may be used as the drive source that moves the gripping member 19 between the holding position and the release position. The user may also manually move the gripping member 19 between the holding position and release position.

In this embodiment the gripping motor 21 functions as both a hold switching unit and a release switching unit, but these units may be separate devices.

The left guide rail 4 and right guide rail 5 extend on the front-rear axis, and guide movement of the peeling unit 6 between the front and back. The front end of the left guide rail 4 is supported by the left panel 13 through a support bracket 22, and the back end of the left guide rail 4 is supported by the left panel 13 through the support pedestal 18. The front end of the right guide rail 5 is likewise supported by the right panel through another support bracket 22, and the back end of the right guide rail 5 is supported by the right panel through the support pedestal 18.

The peeling unit 6 peels the labels Pb from the liner Pa of the label paper P conveyed from the label printer 100. The peeling unit 6 is disposed in front of the holding unit 3, that is, downstream from the holding unit 3 on the conveyance path of the label paper P. Note that upstream and downstream as used herein are referenced to the normal forward conveyance direction of the label paper P.

The peeling unit 6 can move bidirectionally between a start peeling position (FIG. 12 A to D) separated from the holding unit 3, and an end peeling position (FIGS. 13 A and B) near the holding unit 3. The peeling unit 6 peels the labels Pb from the liner Pa by moving from the start peeling position to the end peeling position while the label paper P is held by the holding unit 3. As a result, the labels Pb are peeled from the liner Pa from the downstream side to the upstream side of the label paper P conveyance path.

Note that the end peeling position is fixed in this embodiment, and the start peeling position moves according to the peeling unit movement distance C described below.

As shown in FIG. 4 to FIG. 7, the peeling unit 6 includes a first peeling part 23 and a second peeling part 24. The second peeling part 24 is disposed pivotably to the first peeling part 23 on a cover rail 25 at the bottom of the second peeling part 24. More specifically, the second peeling part 24 pivots between a closed position (see FIG. 4) closing the front of the first peeling part 23, and an open position (see FIG. 6) that opens the front of the first peeling part 23. When setting the label paper P in the peeling unit 6, the user rotates the second peeling part 24 from the closed position to the open position. The user then inserts the leading end of the label paper P between the peeling drive roller 32 (described further below) of the first peeling part 23, and the driven peeling roller 48 (described further below) of the second peeling part 24. The user then returns the second peeling part 24 to the closed position. This loads the label paper P in the peeling unit 6. The liner Pa from which the labels Pb are removed is fed between the first peeling part 23 and second peeling part 24 to the inclined panel 16.

The first peeling part 23 includes a peeler frame 26, a guide mount 27, a peeling member 28, a peeling member support 29, a peeling conveyance motor 31, and a peeling drive roller 32.

Note that the peeling conveyance motor 31 is an example of a first drive source.

The peeler frame 26 supports the other parts of the first peeling part 23. The peeler frame 26 is basically like a box that is open to the top and front.

The guide mount 27 is for mounting the peeling unit 6 slidably front and back on the left guide rail 4 and right guide rail 5. The guide mount 27 includes a left mount 33, a right mount 34, and a connector 35. The connector 35 extends left and right, and connects the left mount 33 and the right mount 34.

The left mount 33 is fastened to the left top end of the peeler frame 26. A left guide engaging part 36 that is U-shaped when seen from the front is disposed to the front end of the left mount 33. The left guide engaging part 36 engages the left guide rail 4 from the inside (right side).

The right mount 34 is fastened to the right top end of the peeler frame 26. A right guide engaging part 37 that is U-shaped when seen from the front is disposed to the front and back ends of the right mount 34. The right guide engaging parts 37 engage the right guide rail 5 from the inside (left side).

A guide roller 38 is disposed on the outside side (right side) of each right guide engaging part 37. When the left guide engaging part 36 and right guide engaging parts 37 are respectively engaged with the left guide rail 4 and right guide rail 5, and the peeling unit 6 moves between the front and back, the guide rollers 38 roll along the outside (right side) of the right guide rail 5.

Note than an endless belt 56 described further below is fastened to the bottom of the right mount 34. A linear detector 59 described further below is disposed above the right mount 34.

When the peeling unit 6 moves from the start peeling position to the end peeling position, the peeling member 28 peels a label Pb from the liner Pa. Only the liner Pa part of the label paper P is bent back by the peeling member 28. The peeling member 28 is disposed to the top of the peeling member support 29 in front of the connector 35 between the left mount 33 and right mount 34.

The narrow flat back side of the peeling member 28 is long left to right, and bends 90 degrees or more down. The peeling member 28 thus has a peeling edge 39 along the back forming an acute angle.

The liner Pa is folded back at this peeling edge 39. A rocking rail (not shown in the figure) is formed protruding down from the middle of the peeling member 28 between the left and right ends. This rocking rail engages a rocking channel (not shown in the figure) disposed to the top of the peeling member support 29. As a result, the peeling member 28 can rock through a plane substantially parallel to the top of conveyance surface from the holding unit 3 to the peeling member 28, that is, the top of the peeling member 28.

Figure 8A:
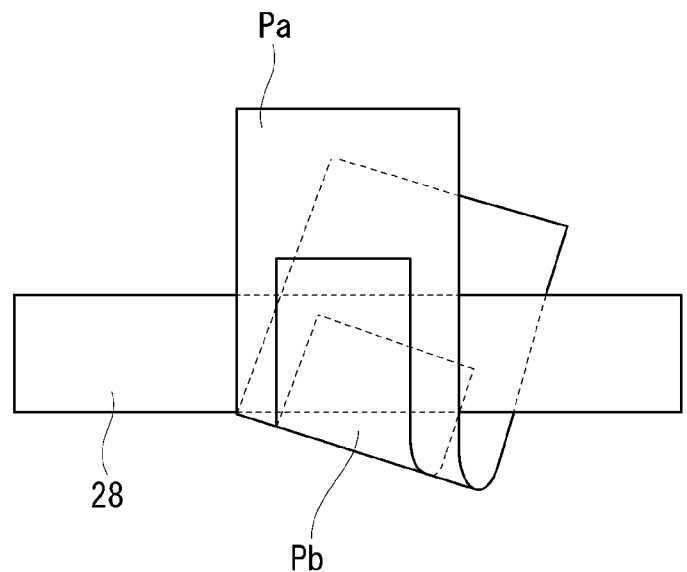
FIGS. 8A and 8B are oblique views describing the rocking action of the peeling member.
Figure 8B:
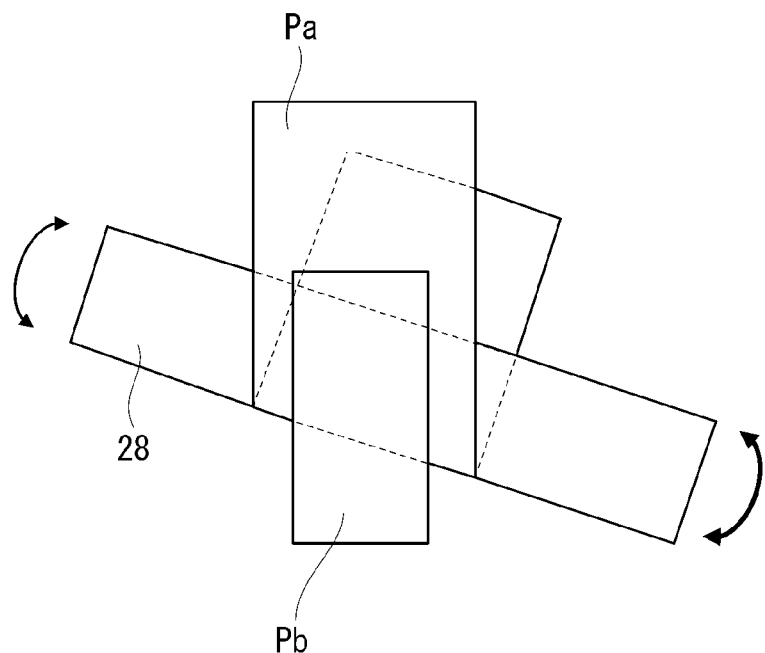

If the peeling member 28 is stationary and the label paper P is set at an angle to the peeling member 28 as shown in FIG. 8 A, the label paper P will lift away from the peeling member 28 and peeling the labels Pb may not be possible. However, because the peeling member 28 in this embodiment of the invention can pivot as shown in FIG. 8 B, the peeling member 28 will pivot and follow the label paper P even if the label paper P is set at an angle to the peeling member 28. As a result, labels Pb can be appropriately peeled from the liner Pa by suppressing separation of the label paper P from the peeling member 28.

A transverse middle member 41 is disposed between the peeling member 28 and connector 35. A longitudinal middle member 42 is disposed between the left and right ends of the peeling member 28 and the left mount 33 and right mount 34. A gap allowing the peeling member 28 to move is provided between the peeling member 28 and the transverse middle member 41, and between the peeling member 28 and the longitudinal middle members 42.

The peeling member support 29 is disposed between the left and right walls of the peeler frame 26. A rocking channel engaged by the rocking rail is disposed in the left-right middle part of the top of the peeling member support 29 as described above. A detector window 43 is opened in the front of the peeling member support 29 in the middle between the left and right ends. The detection probe 44 of the slack detector 9 protrudes from the detector window 43.

The peeling conveyance motor 31 drives the peeling drive roller 32 forward and reverse. The peeling conveyance motor 31 is fixed to the inside of the left wall of the peeler frame 26. A transmission gear 45 that transfers drive power from the peeling conveyance motor 31 to the peeling drive roller 32 is disposed to the outside of the left wall of the peeler frame 26.

The peeling drive roller 32 and the driven peeling roller 48 disposed to the second peeling part 24 embody a peeling conveyance roller 46, which is a nip roller unit, that rotates and conveys the label paper P.

The peeling conveyance roller 46 is located downstream from the peeling member 28 on the label paper P conveyance path. The peeling conveyance roller 46 can convey the label paper P forward (forward feed) or in reverse (back feed). The peeling drive roller 32 extends left and right with the ends supported rotatably by the left wall and right wall of the peeler frame 26.

The peeling conveyance roller 46 is an example of a conveyance unit.

The second peeling part 24 includes a peeler cover 47 and the driven peeling roller 48.

The peeler cover 47 is shaped like a box that is open near the bottom of the back. The peeler cover 47 is attached by the cover rail 25 rotatably to the peeler frame 26.

The label detector 11 is disposed to the top of the peeler cover 47.

The driven peeling roller 48 extends left and right, and the ends thereof are rotatably supported by the peeler cover 47. The driven peeling roller 48 is exposed from the opening near the bottom of the rear of the peeler cover 47, and rotates following the peeling drive roller 32.

The driven peeling roller 48 and peeling drive roller 32 are integrated with the peeling member 28 through the peeler frame 26. More specifically, the peeling conveyance roller 46 embodied by the peeling drive roller 32 and driven peeling roller 48 moves in unison with the peeling member 28 bidirectionally between the start peeling position and end peeling position. Therefore, change in the turning angle \ of the liner Pa created by the peeling member 28 and peeling conveyance roller 46 when the peeling member 28 moves to and away from the holding unit 3 can be suppressed. See FIG. 13 A. As a result, labels Pb can be peeled consistently from the liner Pa.

By feeding the label paper P forward by the peeling conveyance roller 46, the peeling unit 6 thus comprised moves itself from the start peeling position to the end peeling position. More specifically, when the label paper P is held by the holding unit 3 and the label paper P is fed forward by the peeling conveyance roller 46, the label paper P becomes taut. The peeling unit 6 is then pushed by the taut label paper P and moves from the start peeling position to the end peeling position. More specifically, the tension on the label paper P causes the peeling unit 6 to move from the start peeling position to the end peeling position.

After the peeling unit 6 moves to the end peeling position, the peeling unit moving unit 7 moves the peeling unit 6 back to the start peeling position.

The peeling unit moving unit 7 includes a peeling unit moving motor 51, a moving gear 52, a drive pulley 53, two driven pulleys 54, a tension pulley 55, the endless belt 56, and a torque limiter 57.

Note that the peeling unit moving motor 51 is an example of a second drive source.

The peeling unit moving motor 51 is the drive source for moving the peeling unit 6 from the end peeling position to the start peeling position. The peeling unit moving motor 51 is fastened to the base plate 12. The moving gear 52 meshes with the output gear (not shown in the figure) fastened to the output shaft of the peeling unit moving motor 51.

The drive pulley 53 has teeth, and is fastened coaxially to the right side of the moving gear 52. The drive pulley 53 and moving gear 52 are rotatably supported at the bottom of the right panel.

The two driven pulleys 54 are rotatably supported at the top of the right panel. The two driven pulleys 54 are disposed front and back on a line substantially parallel to the right guide rail 5.

The tension pulley 55 is disposed between the drive pulley 53 and the rear driven pulley 54. The tension pulley 55 pushes against the outside surface of the endless belt 56, causing the endless belt 56 to curve around the tension pulley 55 and applying tension to the endless belt 56.

The endless belt 56 has teeth, and is mounted on the drive pulley 53 and two driven pulleys 54. The right mount 34 described above is fastened to the endless belt 56 between the two driven pulleys 54.

Figure 9A:
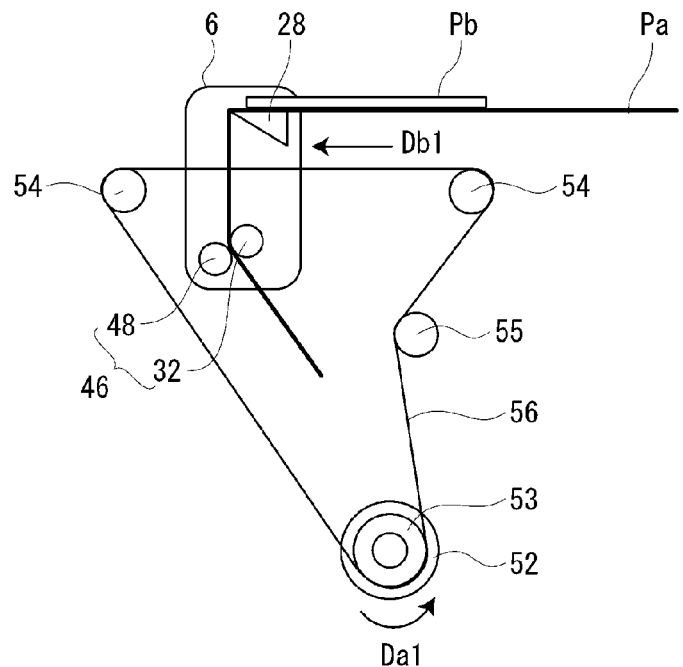
FIGS. 9A and 9B illustrate operation of the peeling unit moving unit when the peeling unit moves from the end peeling position to the start peeling position, and (b) illustrates operation of the peeling unit moving unit when the peeling unit moves from the start peeling position to the end peeling position.

As shown in FIGS. 9A and 9D, the direction of drive pulley 53 rotation when turning counterclockwise as seen from the right is referred to below as the first direction of rotation Da1, and the direction of rotation when turning clockwise is second direction of rotation Da2. Likewise, the direction of endless belt 56 rotation when travelling counterclockwise as seen from the right is referred to below as the first direction of travel Db1, and the direction of rotation when travelling clockwise is second direction of travel Db2.

Figure 9B:
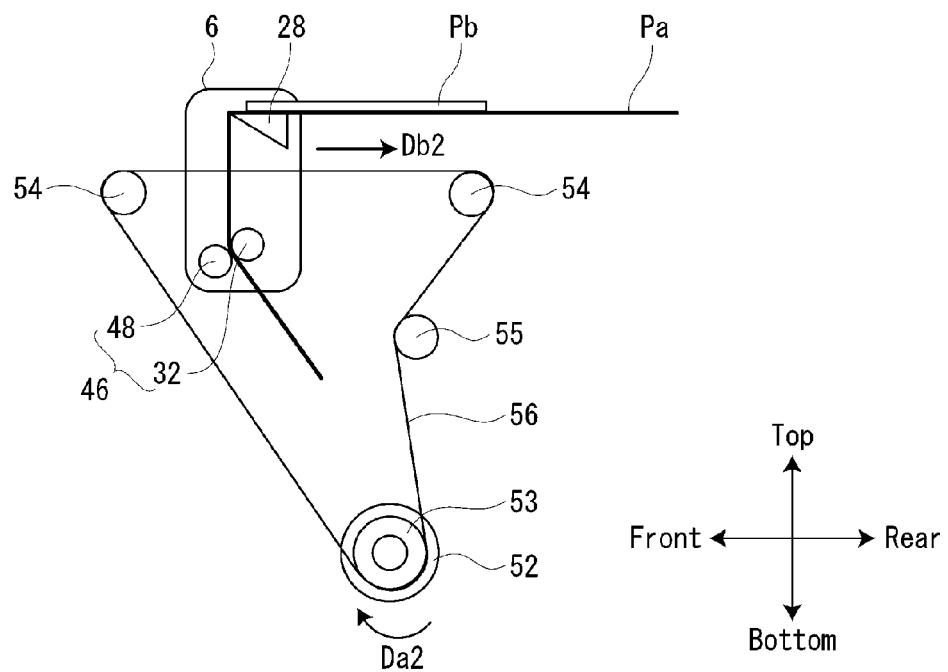

When the peeling unit moving motor 51 of the peeling unit moving unit 7 rotationally drives the drive pulley 53 in the first direction of rotation Da1, the endless belt 56 moves in the first direction of travel Db1, and the peeling unit 6 moves from the end peeling position to the start peeling position (see FIG. 9 A). As described above, when the label paper P is held by the holding unit 3 and the peeling conveyance motor 31 conveys the label paper P forward, the peeling unit 6 is pushed by the label paper P and moves from the start peeling position to the end peeling position. At this time, the endless belt 56 travels in the second direction of travel Db2, and the drive pulley 53 turns in the second direction of rotation Da2 (see FIG. 9 B).

The torque limiter 57 is coaxially connected to the left side of the moving gear 52. The torque limiter 57 limits the torque in the second direction of rotation Da2 of the drive pulley 53 to a set torque limit. As a result, when the peeling unit 6 moves from the start peeling position to the end peeling position, a substantially constant load is applied to the peeling unit 6. Tension corresponding to the load applied to the peeling unit 6 by the torque limiter 57 is therefore applied to the label paper P folded back by the peeling member 28. As a result, the label paper P can be appropriately folded back by the peeling member 28.

The linear encoder 8 detects the position of the peeling unit 6 on the front-back axis. The linear encoder 8 includes a linear scale 58 and linear detector 59. The linear scale 58 is disposed above the right guide rail 5 and substantially parallel to the right guide rail 5. More specifically, the linear scale 58 extends between the start peeling position and end peeling position.

The linear scale 58 has a scale of slits (not shown in the figure). The linear detector 59 is disposed to the top of the right mount 34. A photo interrupter, for example, may be used as the linear detector 59. The linear encoder 8 outputs a pulse signal to a controller 60 in conjunction with movement of the peeling unit 6.

The slack detector 9 detects slack in the label paper P between the peeling member 28 and peeling drive roller 32. A microswitch, for example, may be used as the slack detector 9. The detection probe 44 of the slack detector 9 protrudes from the detector window 43 as described above.

When the slack in the label paper P between the peeling member 28 and peeling drive roller 32 is less than a specific amount, the detection probe 44 is pushed by the label paper P and recedes into the detector window 43, and the slack detector 9 turns on. That there is less than the specific amount of slack in the label paper P, or more specifically that there is no slack in the label paper P, is thus detected.

However, if the slack in the label paper P between the peeling member 28 and peeling drive roller 32 exceeds this specific amount, the detection probe 44 protrudes from the detector window 43, and the slack detector 9 turns off. That the slack in the label paper P exceeds the limit, or more specifically that there is slack in the label paper P, is thus detected.

The label detector 11 detects if a label Pb has been removed from the liner Pa. The label detector 11 is disposed to the top of the peeler cover 47 in the middle between the left and right ends. A reflective photo interrupter, for example, may be used as the label detector 11. The label detector 11 outputs a Low signal to the controller 60 described further below when a label Pb is left on the liner Pa. If the label Pb has been removed from the liner Pa, the label detector 11 outputs a High signal to the controller 60. The Low and High output states of the detection signal may obviously be reversed.

Figure 10:
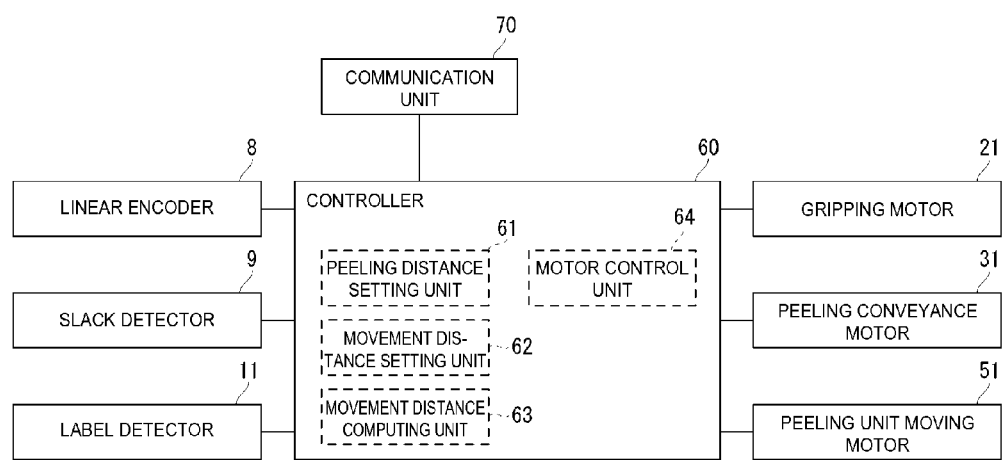
FIG. 10 is a block diagram of the control system of the label peeling device.

The control system of the label peeling device 1 according to this embodiment is described next with reference to FIG. 10. As shown in FIG. 10, the label peeling device 1 has a controller 60 and a communication unit 70.

The communication unit 70 is communicatively connected between the controller 60 and an external device such as the label printer 100. The communication unit 70 receives and supplies data from the external device to the controller 60.

The controller 60 includes a CPU (central processing unit) and memory. The gripping motor 21, peeling conveyance motor 31, and peeling unit moving motor 51 are connected through drivers not shown to the output side of the controller 60.

The controller 60 functionally includes a peeling distance setting unit 61, a movement distance setting unit 62, a movement distance computing unit 63, and a motor control unit 64. These function units are embodied by the cooperation of the hardware of the controller 60 and software stored in memory.

The peeling distance setting unit 61 sets a peeling distance A. The movement distance setting unit 62 sets a peeling unit movement distance C by adding a specific additional distance B to the peeling distance A.

Figure 11:
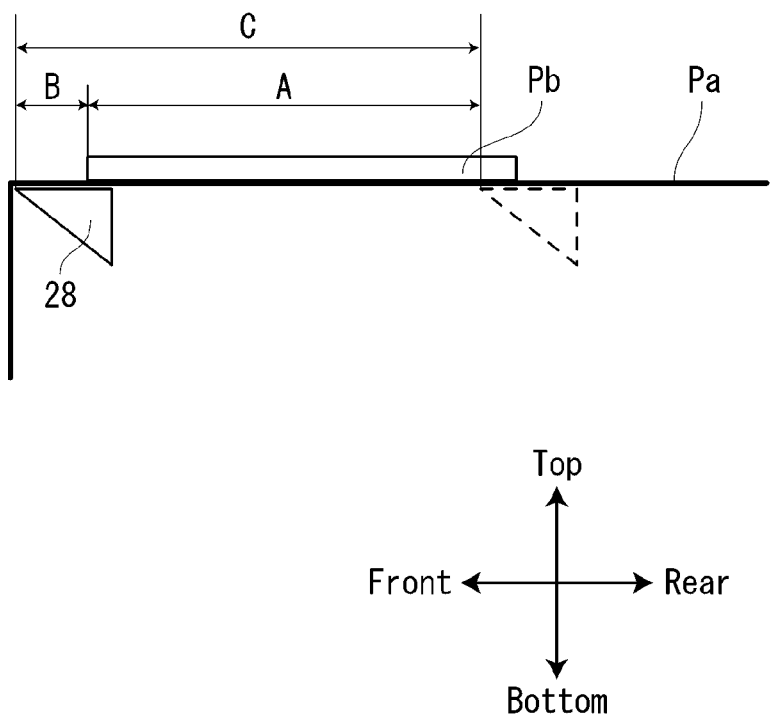
FIG. 11 is used to describe the peeling distance, additional distance, and peeling unit movement distance.

The peeling distance A, additional distance B, and peeling unit movement distance C are described next with reference to FIG. 11.

The peeling distance A is the distance a label Pb is peeled from the liner Pa in the lengthwise direction of the label paper P. The peeling distance setting unit 61 may set the peeling distance A based on the length of the label Pb acquired from the label printer 100, or based on a value input by the user, for example. Note that peeling distance A is preferably slightly shorter than the label Pb.

The additional distance B is equal to the distance between the peeling member 28 when the peeling unit 6 is at the start peeling position, and the downstream end of the label Pb. More specifically, the peeling member 28 starts moving from the position additional distance B downstream from the downstream end of the label Pb. Note that the additional distance B may be 0 mm, but is preferably several millimeters so that peeling starts reliably from the downstream end of the label Pb.

The peeling unit movement distance C is the distance between the start peeling position and the end peeling position of the peeling unit 6. Note that peeling unit movement distance C is an example of the peeling unit movement distance.

By counting the pulse signals output from the linear encoder 8, the movement distance computing unit 63 calculates the position from the peeling unit 6 to the start peeling position or the end peeling position, that is, the distance the peeling unit 6 has moved.

The motor control unit 64 controls driving the gripping motor 21, peeling conveyance motor 31, and peeling unit moving motor 51.

More specifically, so that when moving the peeling unit 6 from the start peeling position to the end peeling position the peeling unit 6 moves the peeling unit movement distance C set by the movement distance setting unit 62, the motor control unit 64 controls driving the peeling conveyance motor 31 based on the movement distance of the peeling unit 6 output from the movement distance computing unit 63. As a result, the peeling unit 6 can be moved from the start peeling position to the end peeling position according to the peeling unit movement distance C that was set. The peeling unit 6 therefore moves from the start peeling position to the end peeling position according to the length of the label Pb when the peeling distance setting unit 61 sets the peeling distance A based on the length of the label Pb. The amount corresponding to the length of the label Pb can therefore be peeled.

In addition, so that when moving the peeling unit 6 from the end peeling position to the start peeling position the peeling unit 6 moves the peeling unit movement distance C set by the movement distance setting unit 62, the motor control unit 64 controls driving the peeling unit moving motor 51 based on the movement distance of the peeling unit 6 output from the movement distance computing unit 63. As a result, the peeling unit 6 can be moved from the end peeling position to the start peeling position according to the peeling unit movement distance C that was set. The peeling unit 6 therefore moves from the end peeling position to the start peeling position according to the length of the label Pb when the peeling distance setting unit 61 sets the peeling distance A based on the length of the label Pb. For example, when the length of the label Pb is long, the start peeling position moves to a position further forward.

Note that the start peeling position may be fixed and the end peeling position changed according to the peeling unit movement distance C, or both the start peeling position and the end peeling position may change according to the peeling unit movement distance C.

After the label paper P is advanced by the peeling conveyance roller 46, that is, after the peeling unit 6 moves from the start peeling position to the end peeling position, and the label detector 11 outputs a Low signal, that is, if the label Pb has not been peeled from the liner Pa, the motor control unit 64 blocks driving the peeling unit moving motor 51. This prevents a label Pb that was peeled from the liner Pa from sticking to the liner Pa again. If the label detector 11 outputs a High signal, that is, the label Pb was removed from the liner Pa, the motor control unit 64 enables driving the peeling unit moving motor 51.

As further described below, the motor control unit 64 also controls the peeling conveyance motor 31 based on the output of the slack detector 9.

The operation of the label peeling device 1 for peeling a label Pb from the liner Pa after an image is printed on the label Pb by the label printer 100 is described next with reference to FIG. 12 and FIG. 13.

Figure 12D:
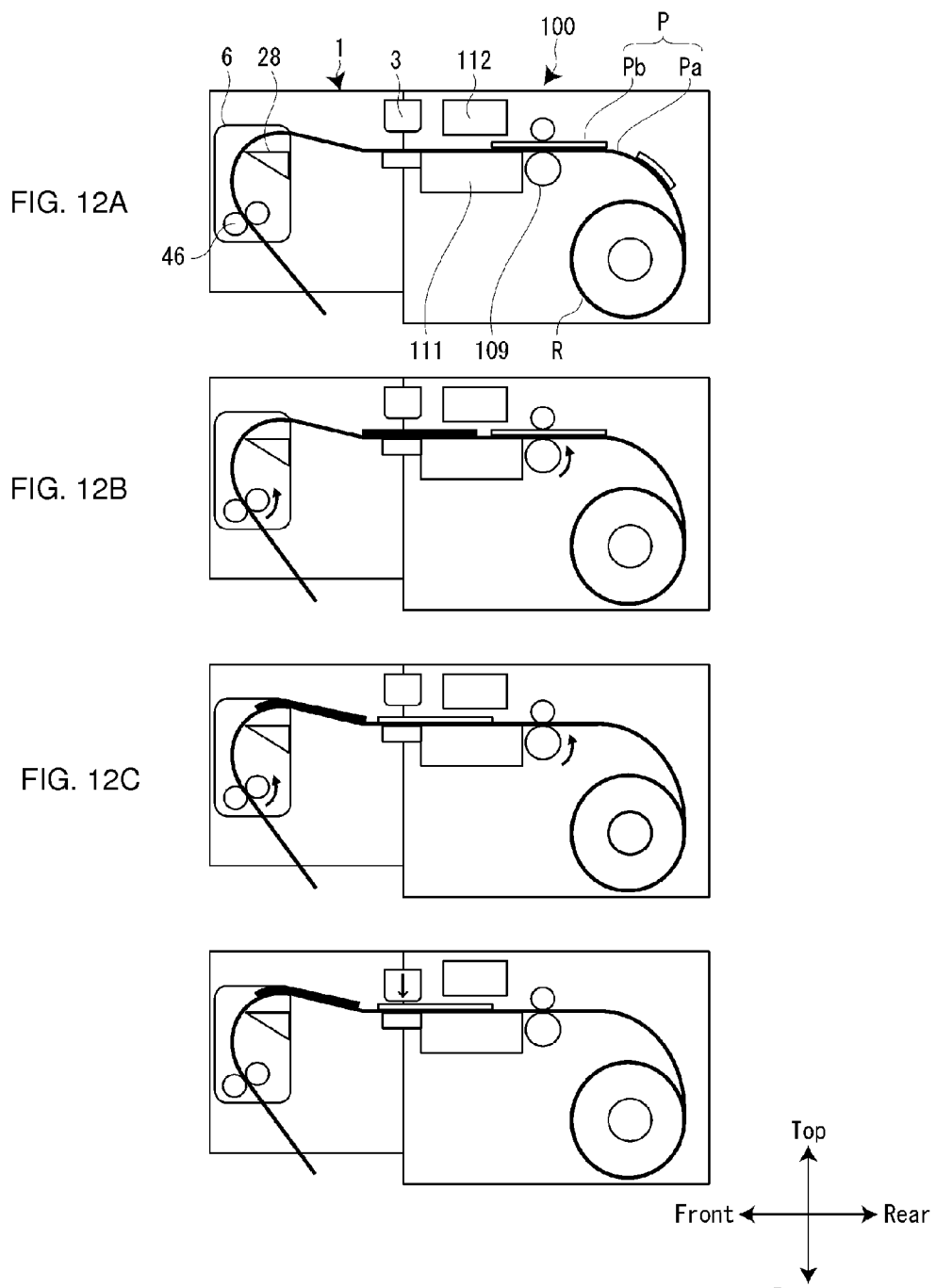
Figure 13A:
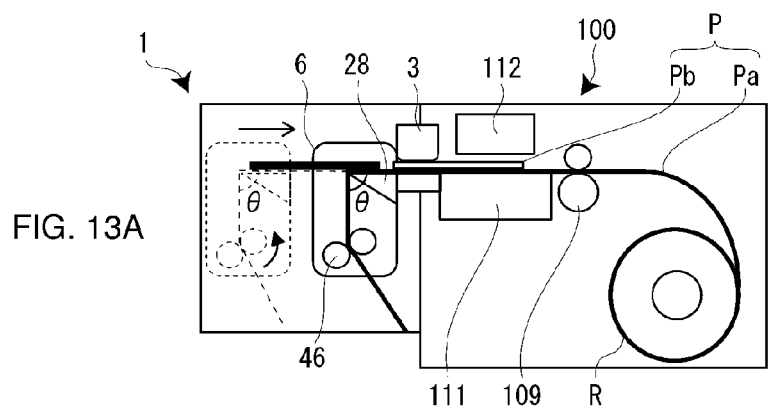
FIGS. 13A-13D show the continued operation shown in FIGS. 12A-12D of peeling a label from the liner in a label peeling device after recording an image on the label in a label printer.
Figure 13B:
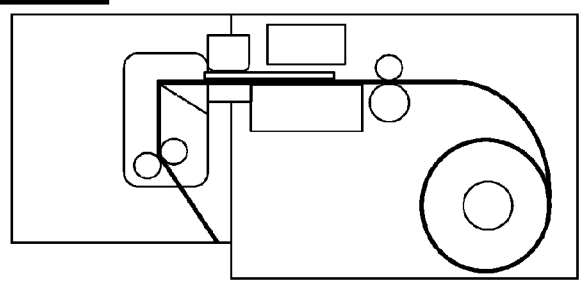
Figure 13C:
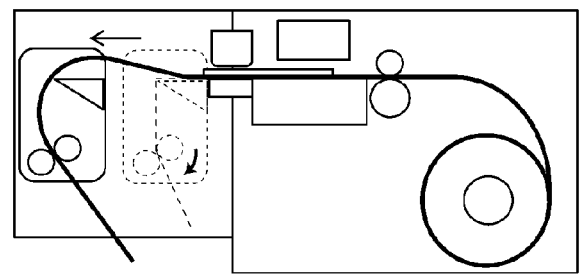
Figure 13D:
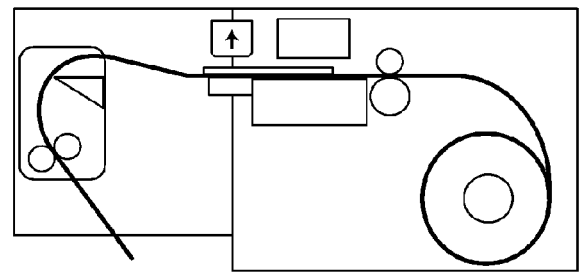
Figure 14A:
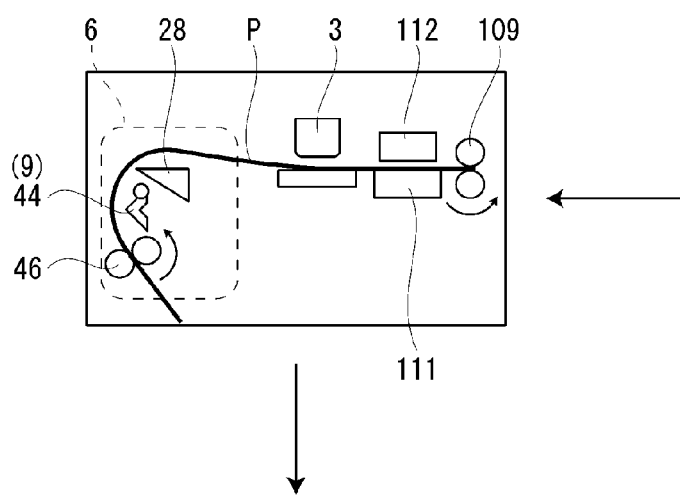
FIGS. 14A-14C illustrate the operation controlling the peeling feed roller based on output from a slack detector when feeding the label paper forward.
Figure 14B:
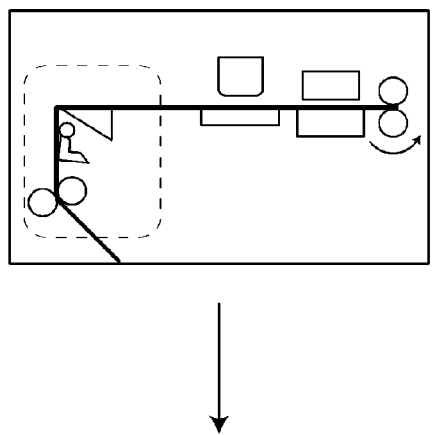
Figure 14C:
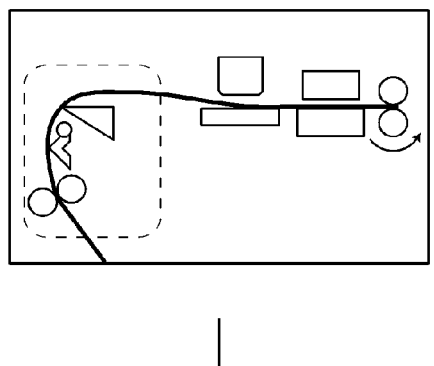
Figure 14C:
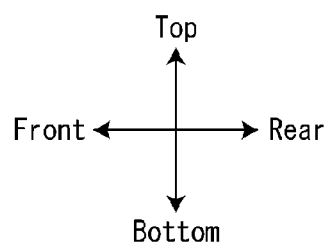
Figure 15A:
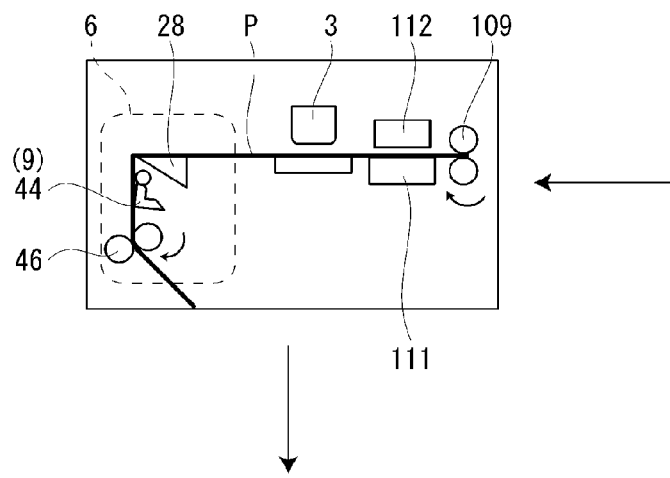
FIGS. 15A-15C illustrate the operation controlling the peeling feed roller based on output from a slack detector when feeding the label paper in reverse.
Figure 15B:
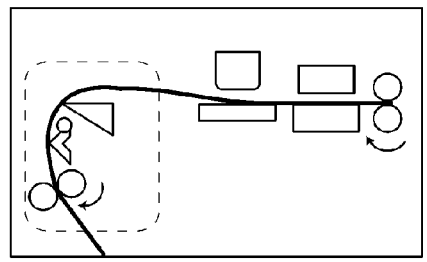
Figure 15C:
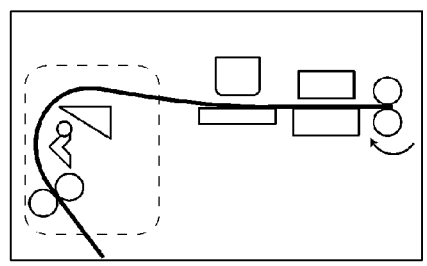
Figure 15C:
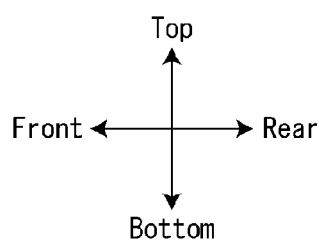

FIG. 12 A shows a label Pb to be printed positioned to the recording head 112. The holding unit 3 of the label peeling device 1 is in the release position. The peeling unit 6 is in the start peeling position.

From this position, the label printer 100 ejects ink from the recording head 112 to record an image on the label Pb while conveying the label paper P with the paper feed roller 109 as shown in FIG. 12 (*b*). At this time, the label peeling device 1 conveys the label paper P with slack by the peeling conveyance roller 46.

Next, as shown in FIG. 12 C, the paper feed roller 109 and peeling conveyance roller 46 convey the label paper P forward with slack until the label Pb with the recorded image reaches the peeling position. The peeling position is the position where the downstream end of the label Pb is additional distance B downstream from the peeling member 28. As a result, when the label paper P is delivered from the label printer 100, excess slack developing in the label paper P can be prevented by the peeling conveyance roller 46 feeding the label paper P forward.

Next, as shown in FIG. 12 D, the holding unit 3 goes to the holding position and the label paper P is held by the holding unit 3.

While the holding unit 3 continues holding the label paper P, the peeling conveyance roller 46 feeds the label paper P the peeling unit movement distance C while the label paper P is kept taut as shown in FIG. 13 A. As a result, the peeling unit 6 moves from the start peeling position to the end peeling position, and the label Pb is peeled the peeling distance A from the downstream end.

Note that when the peeling unit 6 is at the end peeling position, the upstream end of the label Pb remains affixed to the liner Pa.

Next, as shown in FIG. 13 B, the label Pb is removed from the liner Pa by the user. The user can therefore get a label Pb that has been desirably printed. When the label Pb is removed from the liner Pa, the label detector 11 outputs a High signal to the controller 60. As a result, the motor control unit 64 allows driving the peeling unit moving motor 51 again.

Next, as shown in FIG. 13 C, the peeling unit moving unit 7 moves the peeling unit 6 peeling unit movement distance C from the end peeling position to the start peeling position while reversing the label paper P with the peeling conveyance roller 46. The distance the label paper P is fed at this time is sufficient to assure there is slack in the label paper P even after the peeling unit 6 returns to the start peeling position. By the peeling conveyance roller 46 reversing the label paper P simultaneously to the peeling unit 6 moving from the end peeling position to the start peeling position, the peeling unit 6 can move smoothly without interference from the label paper P even if the label paper P is still held by the holding unit 3 when the peeling unit 6 moves from the end peeling position to the start peeling position. Note that there is no need for the label paper P to be reversed simultaneously to the peeling unit 6 moving from the end peeling position to the start peeling position, and the peeling unit 6 may be moved after the label paper P is reversed.

Next, as shown in FIG. 13 D, the holding unit 3 is moved to the release position by driving the gripping motor 21 and moving the gripping member 19 to the release position. The label paper P is then reversed with slack therein by the paper feed roller 109 and peeling conveyance roller 46 until the next label Pb reaches the start printing position. This completes the complete operating sequence for printing and peeling one label Pb.

As described above, when the label paper P is conveyed with the holding unit 3 in the release position, the label peeling device 1 conveys the label paper P with slack. As a result, creating a difference between the actual conveyance distance of the label paper P and the rotational feed distance of the paper feed roller 109, that is, the outside circumference of the paper feed roller 109 multiplied by the number of paper feed roller 109 revolutions, can be suppressed. This is described further below.

Conveying the label paper P forward is described next.

As shown in FIG. 14 A, starting with the slack detector 9 off, the label paper P is conveyed forward with the rotational conveyance speed Vpe of the peeling conveyance roller 46 greater than the rotational conveyance speed Vpf of the paper feed roller 109. As a result, the slack in the label paper P decreases between the paper feed roller 109 and peeling conveyance roller 46.

Note that the rotational conveyance speed Vpf of the paper feed roller 109 is the product of the outside circumference of the paper feed roller 109 multiplied by the rotational speed of the paper feed roller 109. The rotational conveyance speed Vpe of the peeling conveyance roller 46 is the product of the outside circumference of the peeling conveyance roller 46 multiplied by the rotational speed of the peeling conveyance roller 46.

As shown in FIG. 14 B, when the slack in the label paper P becomes less than the specific amount, the slack detector 9 turns on and No Slack is detected. When the slack detector 9 is on, the motor control unit 64 stops the peeling conveyance roller 46. As a result, the peeling conveyance roller 46 stops forward conveyance of the label paper P. The paper feed roller 109 continues turning at this time. As a result, the slack in the label paper P increases.

As shown in FIG. 14 C, when the slack in the label paper P reaches the specific amount, the slack detector 9 turns off and slack is detected in the label paper P.

As shown in FIG. 14 A, when the slack detector 9 turns off, the motor control unit 64 resumes driving the peeling conveyance roller 46 after a delay, that is, after waiting a specific time. As a result, the peeling conveyance roller 46 resumes feeding the label paper P forward.

A specific amount or more of slack can therefore be constantly maintained by repeating this process. The actual conveyance of the label paper P becoming greater than the rotational conveyance distance of the paper feed roller 109 during forward conveyance can therefore be suppressed.

Reverse conveyance of the label paper P is described next.

As shown in FIG. 15 A, starting with the slack detector 9 on, the label paper P is conveyed in reverse with the rotational conveyance speed Vpe of the peeling conveyance roller 46 greater than the rotational conveyance speed Vpf of the paper feed roller 109. As a result, the slack in the label paper P increases between the paper feed roller 109 and peeling conveyance roller 46.

As shown in FIG. 15 B, when the slack in the label paper P equals or exceeds the specific amount, the slack detector 9 turns off and slack in the label paper P is detected.

As shown in FIG. 15 C, when the slack detector 9 turns off, the motor control unit 64 stops driving the peeling conveyance roller 46 after a delay, that is, after waiting a specific time. As a result, the peeling conveyance roller 46 stops back feeding the label paper P. The paper feed roller 109 continues turning at this time. As a result, the slack in the label paper P decreases.

When the slack in the label paper P is less than the specific amount as shown in FIG. 15 A and the slack detector 9 turns on, No Slack is detected. When the slack detector 9 turns on, the motor control unit 64 resumes driving the peeling conveyance roller 46. As a result, the peeling conveyance roller 46 resumes reversing the label paper P. By repeating this process, a specific amount of slack can be constantly maintained. The actual conveyance of the label paper P becoming less than the rotational conveyance distance of the paper feed roller 109 during reverse conveyance can therefore be suppressed.

With the label peeling device 1 according to the embodiment described above, labels Pb can be peeled from the liner Pa by the peeling unit 6 while the label paper P is held between the label printer 100 and the peeling unit 6 by the holding unit 3. Pulling the label paper P from the label printer 100 can therefore be suppressed. As a result, problems such as the position where an image is recorded on a label Pb being shifted can be prevented.

The invention is not limited to the foregoing and can be modified as described below.

For example, the construction that moves the peeling unit 6 from the start peeling position to the end peeling position may be the peeling unit moving unit 7 or a construction other than the peeling unit moving unit 7. Further alternatively, the peeling unit 6 may be configured so that the peeling conveyance roller 46 does not move and only the peeling member 28 moves between the start peeling position and end peeling position.

Further alternatively, the peeling unit 6 may be constructed to peel labels Pb from the liner Pa using a suction pad that can move vertically and horizontally, for example, without moving the peeling member 28 from the start peeling position to the end peeling position.

Further alternatively, the label peeling device 1 may be incorporated in the label printer 100. More specifically, the label printer 100 may be configured with the holding unit 3, peeling unit 6, and other parts of the label peeling device 1.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A label peeling device comprising:
   a holding unit configured to hold label paper conveyed from a fluid ejection device that ejects fluid onto label paper, the label paper having a label and a liner to which the label is affixed;
   a peeling unit configured to peel the label from the liner of the label paper fed from the fluid ejection device, the peeling unit being disposed on a downstream side of the holding unit in a conveyance path of the label paper;
   a slack detector configured to detect if there is slack in the label paper; and
   a control unit configured to control the peeling unit to peel the label from the liner when the label paper is held by the holding unit, wherein,
   when the label paper is not held by the holding unit,
      the control unit configured to stop conveyance of the label paper if the slack detector detects there is no slack in the label paper; and
      the control unit configured to resume conveyance of the label paper after the slack detector detects there is slack in the label paper, after the control unit stops the conveyance of the label paper.

2. The label peeling device described in claim 1, wherein:
   the peeling unit comprises a peeling member configured to move between a start peeling position and an end peeling position more proximal to the holding unit than the start peeling position;
   wherein, when the peeling member moves from the start peeling position to the end peeling position the label is peeled from the liner; and
   a conveyance unit disposed on a downstream side of the peeling member in the conveyance path, configured to convey the label paper;
   wherein, the conveyance unit is configured to move together with the peeling member.

3. The label peeling device described in claim 2, wherein:
   when the label paper is conveyed from the fluid ejection device, the conveyance unit conveys the label paper with the label paper not being held by the holding unit.

4. The label peeling device described in claim 2, further comprising:
   a peeling member moving motor configured to move the peeling member; wherein,
   the control unit controls the peeling member moving motor to move the peeling member from the end peeling position to the start peeling position.

5. The label peeling device described in claim 4, wherein:
   the control unit switches the holding unit from a holding position, in which the holding unit holds the label paper, to a release position, in which the holding unit does not hold the label paper, after the peeling member is moved from the end peeling position to the start peeling position.

6. The label peeling device described in claim 1, wherein:
the control unit switches the holding unit from a release position in which the holding unit does not hold the label paper to a holding position in which the holding unit holds the label paper, after the conveyance of the label paper.

7. The label peeling device described in claim 6, wherein:
the control unit executes the conveyance of the label paper in a reverse direction which is a direction toward upstream of the conveyance path, before or simultaneously to a peeling member of the peeling unit moving from an end peeling position to a start peeling position.

8. The label peeling device described in claim 7, wherein:
when the conveyance unit executes the conveyance of the label paper in the reverse direction, the control unit stops reverse conveyance of the label paper when the slack detector detects there is slack in the label paper, and resumes the reverse conveyance of the label paper when the slack detector detects there is no slack in the label paper after the reverse conveyance stops.

9. The label peeling device described in claim 1, further comprising:
a first drive source configured to move a peeling member included in the peeling unit between a start peeling position and an end peeling position; and
a position detection unit configured to detect the position of the peeling member;
wherein the control unit controls the first drive source based on the detected position of the peeling member detected by the position detection unit.

10. The label peeling device described in claim 9, wherein:
the control unit sets a peeling member movement distance which is a distance between the start peeling position and end peeling position; and
the control unit controls the first drive source based on the peeling member movement distance.

11. The label peeling device described in claim 9, further comprising:
a second drive source configured to move the peeling member from the end peeling position to the start peeling position after the peeling member moves from the start peeling position to the end peeling position;
wherein the control unit controls the first drive source to move the peeling member from the start peeling position to the end peeling position, and controls the second drive source based on the position of the peeling member detected by the position detection unit.

12. The label peeling device described in claim 11, wherein:
the control unit sets a peeling member movement distance which is a distance between the start peeling position and end peeling position; and
wherein the control unit controls the second drive source based on the peeling member movement distance.

13. The label peeling device described in claim 11, further comprising:
a label detector configured to detect if a peeled label has been removed from the liner;
wherein, after the peeling member moves from the start peeling position to the end peeling position, the control unit blocks moving the peeling member from the end peeling position to the start peeling position, if the label detector detects the label has not been removed from the liner.

14. The label peeling device described in claim 9, wherein:
the position detection unit has a linear scale having markings extending between the start peeling position and the end peeling position; and
a linear detector configured to read the markings.

15. A fluid ejection device comprising:
a fluid ejection unit configured to eject fluid onto label paper, the label paper including a label and a liner to which the label is affixed;
a peeling unit configured to peel the label from the liner of the label paper fed from the fluid ejection unit;
a holding unit configured to hold the label paper on an upstream side of the peeling unit in the conveyance path of the label paper;
a slack detector configured to detect if there is slack in the label paper; and
a control unit configured to control the peeling unit to peel the label from the liner when the label paper is held by the holding unit, wherein,
when the label paper is not held by the holding unit,
the control unit configured to stop conveyance of the label paper if the slack detector detects there is no slack in the label paper; and
the control unit configured to resume conveyance of the label paper after the slack detector detects there is slack in the label paper, after the control unit stops the conveyance of the label paper;
wherein, the holding unit holds the label paper when the peeling unit peels the label from the liner.

16. The fluid ejection device described in claim 15, wherein:
the peeling unit comprises a peeling member configured to move between a start peeling position and an end peeling position more proximal to the holding unit than the start peeling position;
wherein, the movement of the peeling member from the start peeling position to the end peeling position peels the label from the liner; and
a conveyance unit disposed on a downstream side of the peeling member in the conveyance path of the label paper, configured to convey the label paper;
wherein, the conveyance unit is configured to move together with the peeling member.

17. The fluid ejection device described in claim 16, further comprising:
a first drive source configured to move the peeling member from the start peeling position to the end peeling position; and
a position detection unit configured to detect the position of the peeling member;
wherein the control unit controls the first drive source based on the detected position of the peeling member detected by the position detection unit.

18. A label peeling method of a label peeling device including a holding unit configured to hold label paper having a label and a liner to which the label is affixed, and a peeling member disposed downstream of the holding unit on a label paper conveyance path, comprising:
holding label paper conveyed from a fluid ejection device that ejects fluid onto label paper;
peeling a label from the liner by a peeling member moving from a start peeling position to an end peeling position more proximal to the holding unit than the start peeling position;

detecting the position of the peeling member when the peeling member moves from the start peeling position to the end peeling position; and conveying the label paper when the label paper is not held and there is slack detected in the label paper and not conveying the label paper when there is no slack detected in the label paper.

19. The label peeling method of a label peeling device described in claim 18, the label peeling device further including a first drive source configured to move the peeling member, the label peeling method further comprising:

controlling the first drive source based on the detected position of the peeling member during the peeling member movement.

* * * * *